United States Patent [19]

Gellert

[11] 4,279,588

[45] Jul. 21, 1981

[54] HOT TIP SEAL

[76] Inventor: Jobst U. Gellert, 7A Prince St., Glen Williams, Ontario, Canada

[21] Appl. No.: 173,081

[22] Filed: Jul. 28, 1980

[30] Foreign Application Priority Data

Jul. 15, 1980 [CA] Canada ............................ 356232

[51] Int. Cl.³ ........................................... B29F 1/03
[52] U.S. Cl. ................................. 425/568; 425/549
[58] Field of Search .............................. 425/549, 568

[56] References Cited

U.S. PATENT DOCUMENTS

| 2,834,050 | 5/1958 | Dymsza ............................ 425/565 X |
| 4,043,740 | 8/1977 | Gellert ................................. 425/566 |
| 4,125,352 | 11/1978 | Gellert ................................. 425/566 |
| 4,212,627 | 7/1980 | Gellert ................................. 425/564 |
| 4,222,733 | 9/1980 | Gellert et al. ...................... 425/566 |

*Primary Examiner*—Thomas P. Pavelko

*Attorney, Agent, or Firm*—Riches, McKenzie & Herbert

[57] ABSTRACT

This invention relates to a hot tip seal located between the nozzle and the gate in an injection molding system. The seal has a generally cylindrical hollow outer portion which is seated in the nozzle and extends to abut on the cavity plate around the gate. Three ribs extend radially from the outer portion to an elongated central pin portion and define apertures therebetween. Pressurized melt flows from a central passage in the nozzle, through the apertures around the central pin portion, and into the cavity. The nozzle seal prevents direct contact between the heated nozzle and the cooled cavity plate to reduce heat loss, while at the same time improves heat transfer to the gate area by conducting heat downstream to a tip of the central pin portion which extends into the gate. In one embodiment, the central pin portion is enlarged and formed of a more conductive material to improve this process.

5 Claims, 4 Drawing Figures

HOT TIP SEAL

BACKGROUND OF THE INVENTION

This invention relates to injection molding and more particularly to an improved seal positioned between the nozzle and the gate.

It is well known that the temperature of the melt in the gate area is critical to satisfactory operation of the system, particularly with materials having high temperature characteristics. Therefore, it is desirable to maintain the melt temperature as it flows into the gate area, but at the same time excessive heat transfer to the cooled cavity plate must be avoided.

In the past, this has been provided by having the melt flow around a central heated torpedo member leading to the gate. However, such an internal heating system has the disadvantage that the melt passage is restricted by the torpedo along a considerable portion of its length resulting in unacceptable pressure drop for most materials. In addition, there is a very high temperature drop across the relatively narrow melt passage from the heated torpedo to the cooler surrounding material. This requires excessively high melt temperatures at the heated torpedo which may result in melt breakdown.

More recently, systems have been provided which are externally heated with a central conductive pin which is not heated extending in the melt to the gate area. While this does avoid the temperature gradient problem, it does not avoid the pressure drop problem. Even more recently, attempts have been made to overcome these problems by providing an externally heated nozzle with an integral central hot tip extending to the gate area. While this, at least partially, overcomes the above mentioned two problems, it introduces the problem of excessive heat loss from the heated nozzle to the surrounding cooled cavity plate. While a space between the nozzle and the cavity plate may be allowed to fill with melt to act as an insulator, this causes problems on colour changes and also may result in deterioration of the trapped melt. A nozzle housing may be provided between the heated nozzle and the cooled cavity plate, but this has the disadvantage of being a considerable added expense.

SUMMARY OF THE INVENTION

The applicant has previously utilized a nozzle seal for valve-gated injection molding as shown in his U.S. Pat. No. 4,043,740 which issued Aug. 23, 1977. It is an object of the present invention to at least partially overcome these disadvantages by providing an improved nozzle seal having a central hot tip.

To this end, in one of its aspect, the invention provides an injection molding system having a nozzle seal seated between a nozzle and a cavity plate wherein melt flows from a central melt passage in the nozzle through the nozzle seal and a gate in the cavity plate into a cavity, having the improvement wherein the seal has a generally cylindrical outer portion, an elongated central pin portion, and a plurality of ribs extending therebetween defining a number of apertures through which the melt flows around the central pin portion and into the cavity, the central pin portion having a first tip which extends downstream into the gate.

Further objects and advantages of the invention will appear from the following description taken together with the accompanying drawings.

DESCRIPTION OF THE PREFERRED EMBODIMENTS

Figure 1:
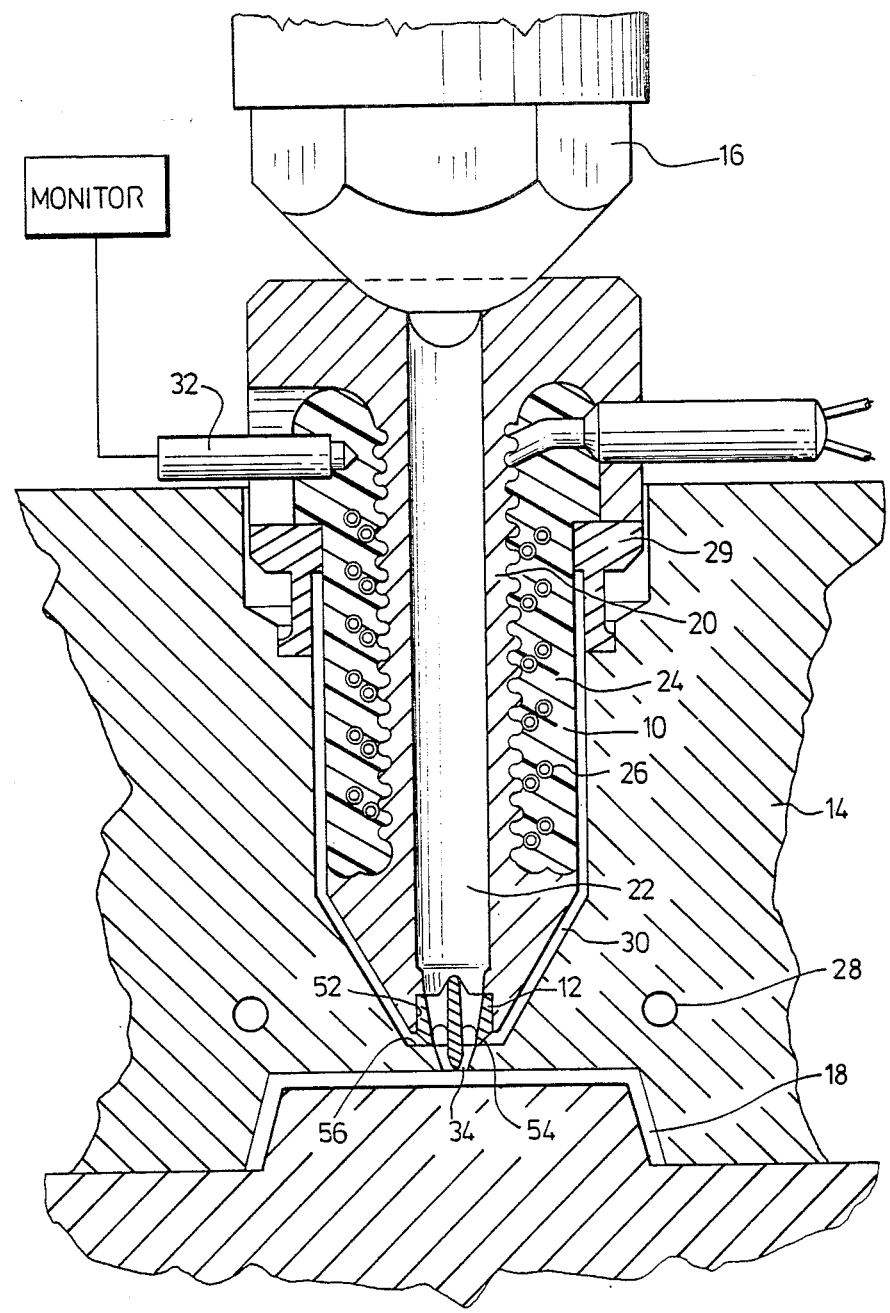
FIG. 1 is a partial sectional view of an injection molding system showing a preferred embodiment of the invention.
Figure 2:
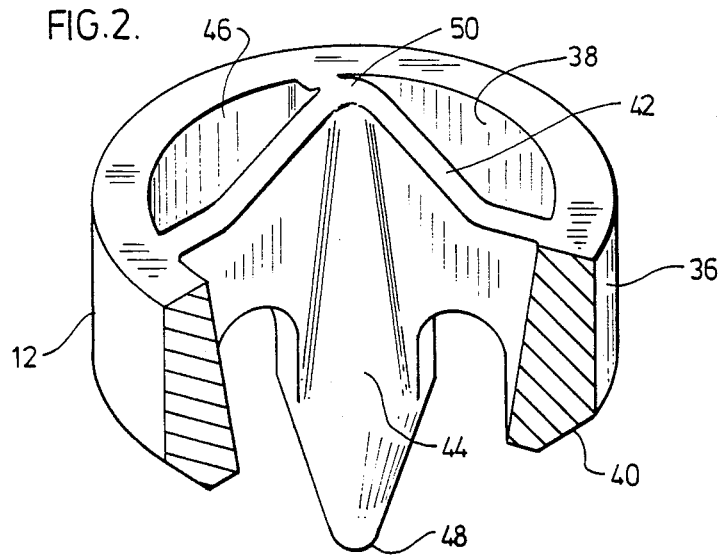
FIG. 2 is an isometric view of the hot tip seal shown in FIG. 1.
Figure 3:
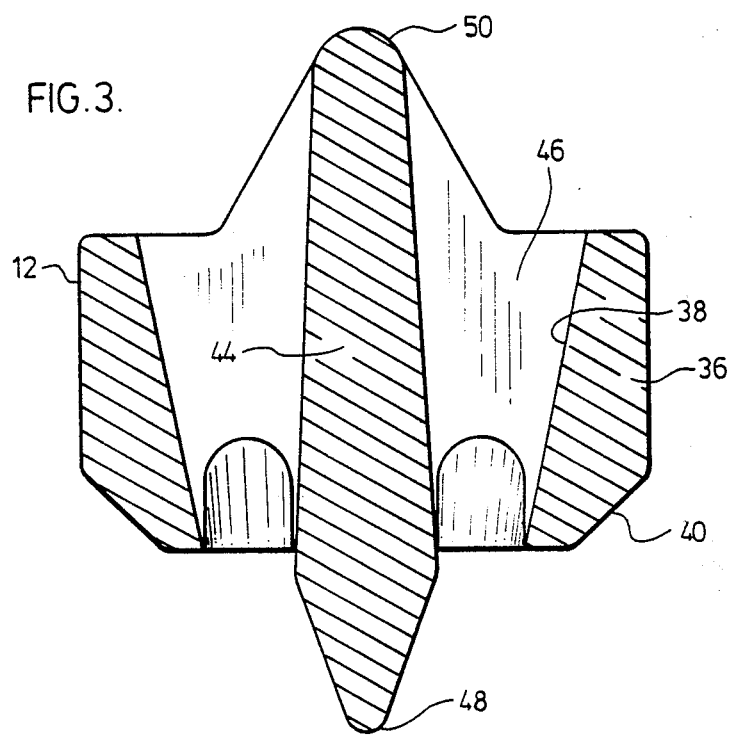
FIG. 3 is a sectional view of the hot tip seal shown in FIG. 1.

Reference is first made to FIG. 1 which shows a sprue bushing or nozzle 10 and a nozzle seal 12 located in a cavity plate 14 between a molding machine 16 and a cavity 18. The nozzle has an inner core portion 20 which defines the central melt passage 22 and a highly heat conductive outer shell portion 24. The nozzle is of the externally heated type with heat being provided by helical coil 26 located in the outer portion 24 which is cast over the undulating outer surface of the inner core portion 20 as more fully described in the applicant's co-pending U.S. patent application Ser. No. 036,880 filed May 8, 1979.

The cavity plate 14 is cooled by cooling elements 28 to solidify the melt in the cavity as quickly as possible. The nozzle 10 is seated in an insulating bushing 29 and air gap 30 provides an insulative barrier between the heated nozzle 10 and the cooled cavity plate 14. The temperature of the nozzle is monitored by thermocouple 32. The inner portion 20 of the nozzle 10 is formed of a beryllium nickel alloy and the outer portion 24 is formed of a beryllium copper alloy, while the cavity plate 14 is formed of steel. As discussed above, it is important to minimize the heat loss from the nozzle 10 to the cavity plate 14, while at the same time maintain the melt temperature as much as possible as it flows into the area of the gate 34. Obtaining a suitable balance between these two conflicting factors, without creating other offsetting disadvantages is critical to the satisfactory operation of the system. Therefore, nozzle seal 12 is provided to avoid direct contact between the heated nozzle 10 and the cooled cavity plate 14, as well as to improve the maintenance of the melt temperature in the gate area.

The nozzle seal 12 has a generally cylindrical hollow out portion 36, although in this embodiment the inner surface 38 is angled to be in alignment with the melt passage 22 through the nozzle 10 and with the gate. Also, its outer corner 40 is bevelled to reduce contact with the cavity plate 14. The nozzle seal 12 has three ribs 42 which extend radially to an elongated central pin portion 44. Apertures 46 are formed between the ribs through which the melt from the melt passage 22 flows around the central pin portion 44 and into the cavity 18. While there is some melt pressure drop as it flows through these apertures, the ribs are of minimum thickness and the apertures of minimum length to reduce it as much as possible. The central pin portion 44 has a first tip 48 which extends downstream into the gate to the edge of the cavity 18 and a second tip 50 which extends upstream into the melt passage 22 in the nozzle. As may be seen, an upper portion of the nozzle seal 12 is securely seated in a cylindrical recess 52 in the nozzle 10 and a lower portion makes contact at operating temperature with an annular seat 54 which extends around the gate 34 in the cavity plate. The nozzle seal 10 is formed of stainless steel or H-13 tool steel and is dimensioned such that the lower portion is slightly spaced from the face 56 of the annular seat 54 when cool, but is brought into bearing contact by thermal expansion when heated to operating temperature. This prevents the escape of the pressurized melt into the air gap 30.

In use, the nozzle 10 is heated up to its operating temperature by helical coil 26 and the cavity plate 14 is cooled to its operating temperature by cooling elements 28 and then operation commences. Melt from the molding machine 16 is injected into the melt passage 22 in the nozzle under very high pressure. The melt flows from the melt passage 22, through the apertures 46 around the central pin portion 44, through the gate 34, and into the cavity 18. The location of the outer portion 36 of the nozzle seal 12 prevents the transfer of excessive heat from the nozzle 10 to the cooled cavity plate 14, while the central pin portion 44 of the nozzle seal 12 which is heated by the melt transfers and maintains this heat into the center of the gate area. After the application of each impulse of pressure from the machine to fill the cavity, the melt solidifies across the gate as the pressure is removed, while maintaining melt temperature around the pin to facilitate the next shot. In order for this to be effective, it is necessary to minimize heat loss into the cavity plate 14 in the gate area. After the product has set, the mold opens to eject it, then closes, and the process is repeated.

Figure 4:
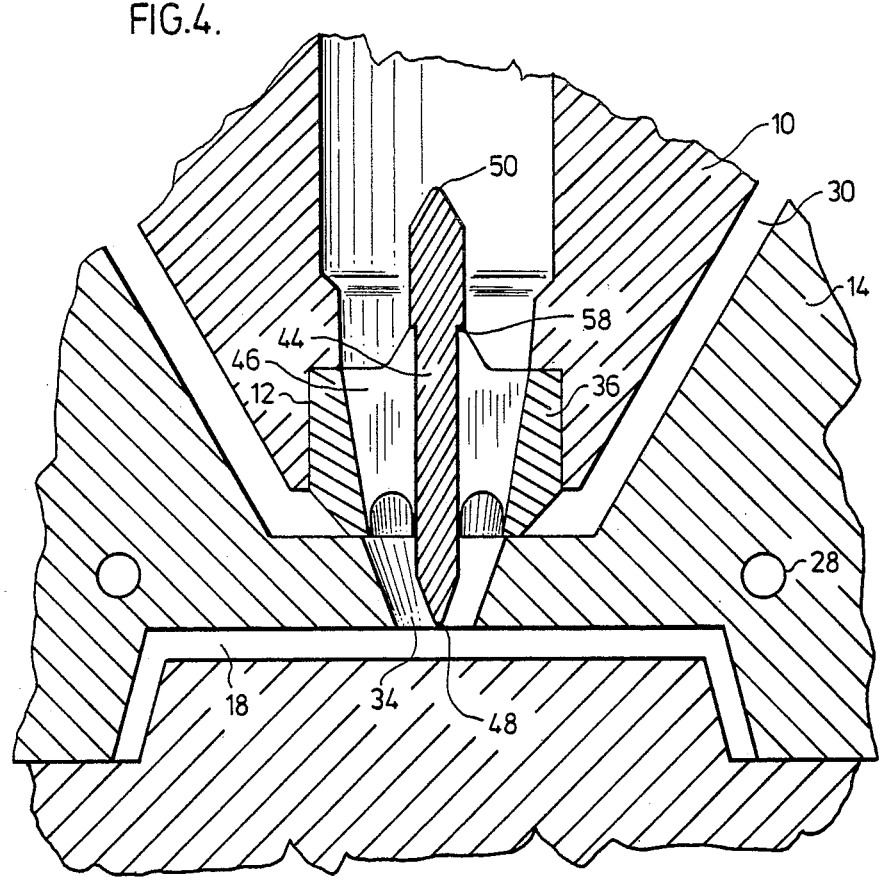
FIG. 4 is a partial sectional view showing another embodiment of the invention.

Referring now to FIG. 4, it partially shows an injection molding system utilizing a nozzle seal according to a second embodiment of the invention. As many of the features are identical to those of the first embodiment, features common to both embodiments are described and illustrated using the same reference numerals. While the location and operation of this embodiment in the system is essentially the same as that described above, the central pin portion 44 of the nozzle seal 12 is elongated to have the second tip 50 extend further upstream into the melt passage 22 of the nozzle 10. Furthermore it is slightly enlarged at the upstream end and is formed of a more conductive material than the outer portion 36 to provide more heat transfer to the gate area. In this embodiment, the outer portion 36 and ribs 42 of the nozzle seal 12 are formed of stainless steel while the central pin portion is formed of beryllium copper alloy and brazed to the ribs 42 at shoulder 58. This provides increased heat transfer to the gate area while retaining the advantage of having the outer portion 36 of the nozzle seal 12 positioned between the nozzle 10 and the cavity plate 14 to reduce heat transfer therebetween.

Although the description of this invention has been given with respect to two particular embodiments, it is not to be construed in a limiting sense. Many variations and modifications will now occur to those skilled in the art. In particular, the lower part of the outer portion 24 of the nozzle seal 12 could be tapered inwardly with the inner surface 38 leading into the gate 34. For a definition of the invention, reference is made to the appended claims.

What I claim is:

1. In an injection molding system having a nozzle seal seated between a nozzle and a cavity plate wherein melt flows from a central melt passage in the nozzle through the nozzle seal and a gate in the cavity plate into a cavity, the improvement wherein the seal has a generally cylindrical outer portion, an elongated central pin portion, and a plurality of ribs extending therebetween defining a number of apertures through which the melt flows around the central pin portion and into the cavity, the central pin portion having a first tip which extends downstream into the gate.

2. A system as claimed in claim 1 wherein the central pin portion has a second tip which extends upstream into the melt passage in the nozzle.

3. A system as claimed in claim 2 wherein the first tip extends through the gate to the cavity.

4. A system as claimed in claim 1, 2 or 3 wherein the central pin portion is formed of a highly heat conductive metal while the outer portion is formed of a material having a substantially lower heat conductivity.

5. A system as claimed in claim 1, 2 or 3 wherein the central pin portion is formed of a beryllium-copper alloy and the outer portion is formed of stainless steel.

* * * * *